United States Patent [19]

Potter et al.

[11] 3,758,669
[45] Sept. 11, 1973

[54] PROCESS FOR THE PREPARATION OF URANIUM NITRIDE POWDER

[75] Inventors: Ralph A. Potter, Kingston; Victor J. Tennery, Oak Ridge, both of Tenn.

[73] Assignee: The United States of America as represented by the United States Atomic Energy Commission, Washington, D.C.

[22] Filed: Nov. 23, 1971

[21] Appl. No.: 201,276

[52] U.S. Cl.................. 423/254, 423/249, 423/250, 423/251, 423/252, 423/255
[51] Int. Cl... C01g 43/00, C01g 56/00, C01g 57/00
[58] Field of Search.................... 423/249, 250, 252, 423/254, 409, 411, 417, 251

[56] References Cited
UNITED STATES PATENTS

| 2,926,071 | 2/1960 | Alexander | 423/411 X |
| 3,322,510 | 5/1967 | Anselin et al. | 423/251 |
| 3,383,184 | 5/1968 | Kioepfer et al. | 423/252 |

*Primary Examiner*—Leland A. Sebastian
*Attorney*—Roland A. Anderson

[57] ABSTRACT

A process is disclosed for the preparation of finely divided uranium nitride, (uranium, plutonium) nitride, americium nitride or neptunium nitride by incrementally dehydriding the corresponding metal hydride and nitriding the dehydrided increment. The process is carried out in a cyclic manner until all of the metal hydride has been converted to metal nitride.

9 Claims, 2 Drawing Figures

INVENTORS.
Ralph A. Potter
Victor J. Tennery
BY

ATTORNEY.

3,758,669

PROCESS FOR THE PREPARATION OF URANIUM NITRIDE POWDER

CROSS REFERENCE TO RELATED APPLICATIONS

The present invention is partially disclosed in commonly assigned copending U. S. application Ser. No. 135,730, filed Apr. 20, 1971. This invention and the invention of the copending application occurred in the course of, or under, an interagency agreement between the U. S. Atomic Energy Commission and the National Aeronautics and Space Administration.

BACKGROUND OF THE INVENTION

The present invention relates to a process for producing unranium nitride powder in large quantities. The term uranium nitride as used herein is meant to include all stoichiometries. Uranium nitride is known to exist in the form $UN_x$, where $x$ is $1.0 \leq x \leq 1.75$, and the term uranium nitride is meant to be inclusive of this range.

Heretofore large quantities, in the range of 0.7 to 2 kilograms, or uranium nitride powder have been produced by first preparing uranium hydride powder from a massive piece of uranium metal. This is done by placing the massive uranium into a reaction chamber containing a hydrogen atmosphere. The massive uranium is then broken down into powder by hydriding the surface of the uranium and then heating to dehydride which leaves the dehydrided portion as finely divided uranium metal. This process usually must be repeated several times in order to convert the entire mass to uranium metal powder. The thus converted uranium is then subjected to a controlled nitrogen atmosphere in order to convert the uranium metal to uranium nitride. The reaction between uranium metal and nitrogen is highly exothermic having a $\Delta H$ reaction of 90 Kcal/mole. With such a high heat of reaction the temperature and rate of the reaction are exceedingly difficult to control, thus making the entire process dangerous. Even under the very best controls there are always areas within the uranium metal which react too vigorously with the excess heat melting adjacent areas of uranium metal. The melted areas show up as agglomerates of uranium metal in the resulting uranium nitride. These agglomerates must then be separated and reprocessed. This process requires 3 to 4 weeks to convert a 1 to 1½ kilogram mass of uranium. The disadvantages of this process are readily apparent. The process is dangerous, requires meticulous atmosphere control, and is ineffective for complete nitride conversion.

Small quantities, e.g., 10 grams, of uranium nitride have been prepared by the process disclosed in U. S. Pat. No. 2,544,277. This process comprises heating small quantities of uranium metal or uranium hydride in an atmosphere of ammonia or nitrogen to effect direct conversion to the nitride. This process is apparently satisfactory for producing small quantities, but when larger amounts of material are used the hydride will not convert directly to the nitride. Also if uranium metal is used as the reactant, the problems associated with the high exothermic heat of reaction are magnified into the problems discussed above. When this process is carried out on small quantities of uranium, problems which are apparently unique to large quantity preparation are not observed. The term large quantities as used herein refers to quantities in excess of 0.1 kilogram of beginning uranium metal reactant. In the preparation of large quantities of uranium nitride unexpected phenomena occur which complicate the problems associated with uranium nitride production. In attempting to control a large scale process using the small scale operating parameters it has been surprisingly found, for reasons which are not exactly clear, that no reaction will occur under temperature and pressure conditions which should cause a rapid reaction to occur. In view of the phenomena associated with uranium nitride production, the process of the above-referenced patent is strictly limited to producing small quantities of uranium nitride. Such a process is thus uneconomical and unsatisfactory for large scale production.

SUMMARY OF THE INVENTION

It is an object of this invention to provide a process for economically producing large quantities of uranium nitride.

It is another object of this invention to provide a process for producing uranium nitride wherein the exothermic heat of reaction is controlled to the extent that no localized areas of melting occur.

It is a further object of this invention to provide a process for producing uranium nitride wherein the product of the process exhibits complete conversion to uranium nitride.

It is a still further object of this invention to overcome unexpected problems uniquely associated with the preparation of large quantities of uranium nitride from uranium hydride powder. The problems are twofold. First, when a large quantity of uranium hydride is heated to normal dehydriding temperature only a small portion, e.g., 10 to 15 percent, of the uranium hydride will decompose to form uranium metal. To dehydride larger amounts of the uranium hydride, temperatures greatly in excess of the normal dehydriding temperature must be resorted to. The second problem is that the uranium metal produced during a dehydriding step is not observed to react with a nitrogen atmosphere at the dehydriding temperature. The second problem is greatly unexpected since uranium metal normally reacts with nitrogen in an almost uncontrollable manner at the dehydriding temperature. It will be seen that these problems are not only overcome by the process of this invention, but that the phenomena which act to create the problems are taken advantage of to provide a process which is superior to any process taught by the prior art.

These and other objects are accomplished by a cyclic process in which a metallic hydride powder is heated in a nitrogen atmosphere to dehydride a portion of the powder and then cooled to nitride the dehyrdrided portion. The steps of heating to dehydride and cooling to nitride are repeated with each dehydriding temperature being higher than the previous dehydriding temperature until complete conversion to the metallic nitride has occurred.

DETAILED DESCRIPTION

According to the invention, large quantities of uranium nitride are produced from a large quantity of uranium hydride powder in a cyclic process by decomposing a small portion of the hydride in a dehydriding reaction to produce a small quantity, about 70–150 grams, of uranium metal. Dehydriding, during the first cycle, is accomplished by heating the uranium hydride to about 300°C in a nitrogen atmosphere of about 760 Torr. At this temperature only a small quantity of dehydrided material will be produced with the remainder of the hydride lying dormant. The dormancy is unexpected but is perhaps attributable to a hydrogen back pressure phenomenon. Surprisingly, the dehydrided portion will not react with the nitrogen atmosphere at this temperature. Contrary to all expectations based upon thermodynamic and kinetic considerations, the temperature must be lowered below the dehydriding temperature in order for the reaction to proceed. The nitriding reaction at lower temperatures is rapid, and complete conversion of the dehydrided portion occurs in approximately 15 minutes.

The second cycle of the process is begun by again heating the remaining hydride power to dehydride a second portion. However, on this cycle the temperature must be raised above the previous dehydriding temperature in order for dehydriding to occur. Normally, the temperature must be raised from 5° to 50°C above the temperature of the previous dehydriding temperature with 15°C being the preferred temperature increase. After the second dehydriding, the temperature must again be lowered in order for nitriding to occur. The kinetics of the nitriding reaction are at a maximum at about 250°C, but the reaction will proceed with reasonable speed at a temperature of from 150°–275°C.

The process is continued in a cyclic manner with each dehydriding temperature being higher than the previous dehydriding temperature and with each nitriding temperature being within the range of 150°–275°C, and preferably 250°C. Usually from 9 to 25 cycles are required to effect complete conversion. At the completion of the cyclic process the dehydriding temperature is within the range of 450°–600°C and preferably about 500°C.

Figure 1:
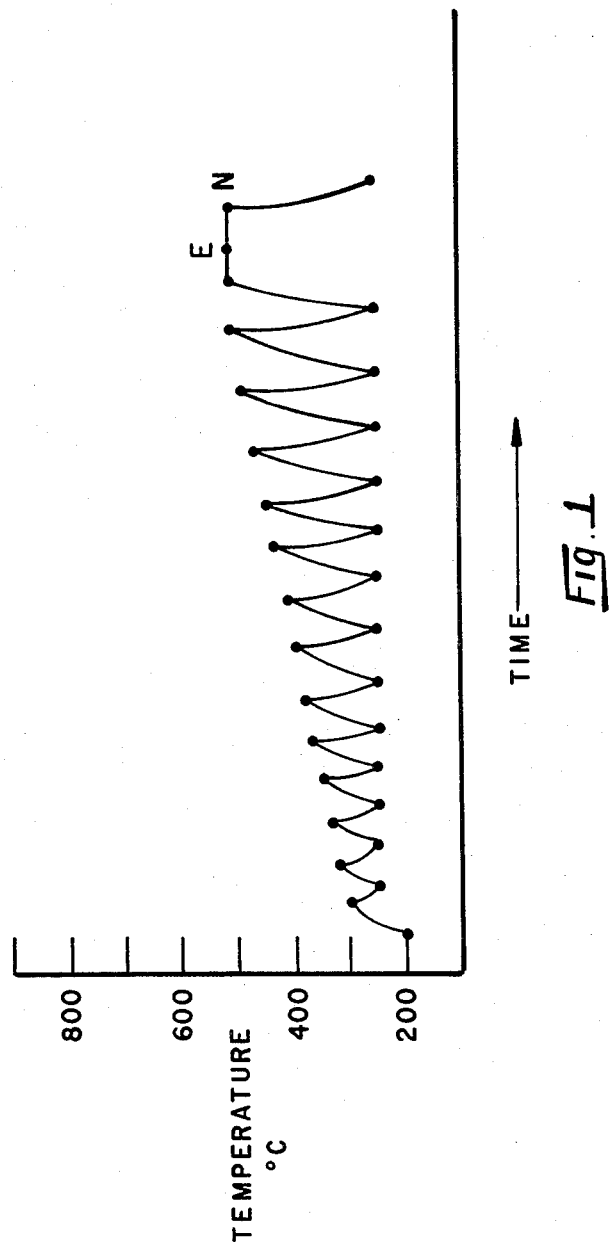
FIG. 1 is a temperature versus time plot of a typical dehydridenitride portion of the process.

As a precaution against the presence of any uranium metal agglomerates, hydrogen can be introduced into the system after the last cycle to hydride any uranium metal which may be present. Nitrogen is then reintroduced into the system to nitride the last remaining amounts of uranium. A temperature versus time chart of a typical dehydride-nitride process of this invention is shown in FIG. 1.

The stoichiometry of the product resulting from the cyclic process generally varies from $UN_{1.5}$ to $UN_{1.6}$. The most desirable product is a mixture of UN with a lesser amount of $UN_{1.5}$. This particular mixture of stoichiometries has an extremely favorable sintering characteristic as is disclosed in the commonly assigned co-pending U. S. application Ser. No. 135,730. In order to adjust the stoichiometry of the product to that of the desirable mixture, the product of the cyclic process is reheated immediately after the last cycle to a temperature of about 900°C while pulling a vacuum on the reaction chamber. When the pressure reaches a value of about $10^{-4}$ Torr the reduction is essentially complete according to the following reaction:

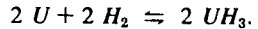
$2\ UN_{1.5} + UN \xrightarrow{\Delta} Y\ UN + 2\ z\ UN_{1.5} + N_2 \uparrow$
where $z \approx 0.05$ to $0.2$
$(Y + 2\ z) = 3\ (Y + 3\ z + 2) = 3 + x$.

The above reaction generally produces a product which has from 80 to 95 percent UN and from 5 to 20 percent $UN_{1.5}$.

The process of this invention may be carried out on uranium hydride which has been previously prepared; however, it is preferred to carry out the process in a continuous operation beginning with a massive piece of uranium metal in a reaction chamber. Uranium hydride powder is prepared from the massive uranium by a series of hydride-dehydride reactions which fragments the massive uranium metal into a fine hydride powder.

The hydride-dehydride process is carried out by first providing a reaction chamber containing a massive piece of uranium metal. A hydrogen atmosphere is introduced into the reaction chamber at a pressure of about 760 Torr and heating is begun. The reaction between hydrogen and uranium is reversible and proceeds as follows:

$2\ U + 2\ H_2 \rightleftharpoons 2\ UH_3$.

The reaction to the right proceeds with reasonable speed at a temperature of from 200° to 250°C under a hydrogen pressure of 760 Torr. The reaction to the left proceeds with reasonable speed in the temperature range of 300°C to 500°C at the same hydrogen pressure. By cycling the temperature between the range 200°C to 250°C and the range 300°C to 500°C, the massive uranium first reacts to form the hydride which causes a localized decrease in density in the uranium and thus swelling and fragmentation. Upon reversing the reaction uranium hydride is dehydrided to form uranium metal powder. The number of hydride-dehydride cycles must be sufficient to fragment the entire mass of uranium. Normally six to eight cycles are sufficient to fragment a 0.7 to 2.0 kilogram mass of uranium.

At this point the dehydride-nitride process of this invention is begun without opening the reaction chamber.

Figure 2:
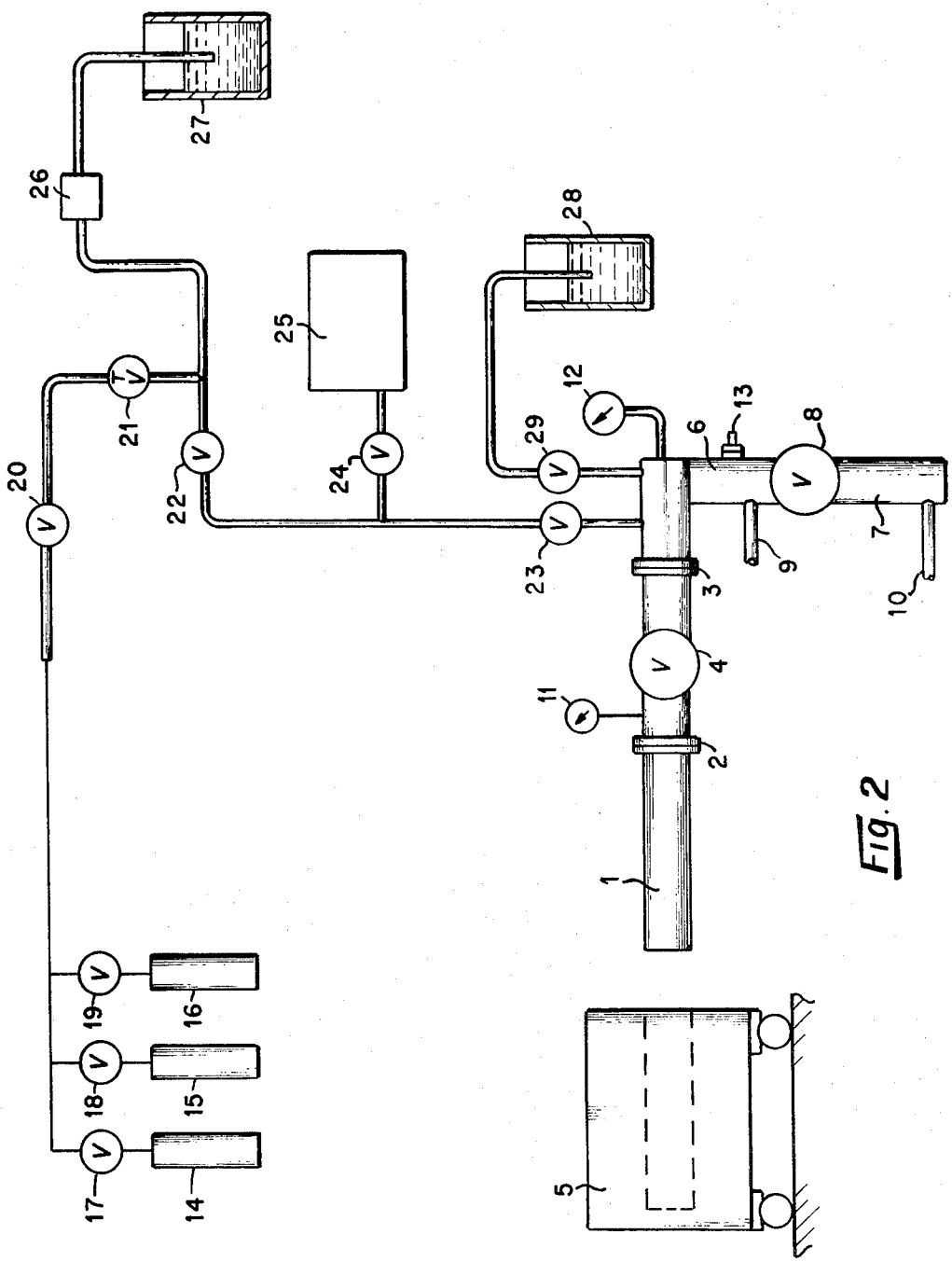
FIG. 2 is a schematic diagram of an apparatus used in practicing the method of this invention.

The following detailed example of the process of this invention is given as an illustration of the invention with reference to FIG. 2 of the accompanying drawings.

A kilogram block of uranium metal was treated to remove all surface oxides by immersing the metal in a 1 N solution of nitric acid. The metal was then washed with absolute ethanol several times and stored under ethanol until transfer into the inert atmosphere of a glove box. Prior to loading into the reaction chamber 1, the metal was subjected to a vacuum of about $4 \times 10^{-4}$ Torr and then placed in an atmosphere of pure argon corresponding to the initial atmosphere within the reaction chamber. The metal was placed in a half cylinder tungsten boat (not shown) which had tungsten grate rods running longitudinally thereof for supporting the massive piece of uranium and for allowing the fragmented powders to fall to the lower section of the boat. The boat was adapted to fit into reaction chamber 1.

The boat with the uranium metal was loaded into reaction chamber 1 while still under an argon atmosphere. The reaction chamber was then closed off by valve 4 and attached to header 6 by means of flange 3. Thereafter valve 4 was opened with valves 23 and 29 closed, and the chamber evacuated by means of a fore pump (not shown) attached to lines 9 and 10, and diffusion pump 7 to a pressure $10^{-6}$ Torr, measured by gages 11 and 12 at higher pressures and ion gage 13 at the lower pressures.

Gases required for the reaction system are from a $H_2$ source 14, a $N_2$ source 15, and an Ar source 16. These are provided with appropriate cut-off valves 17, 18 and 19. A main cut-off valve 20 and a throttle valve 21 are the principal control elements for feeding gas into header 6. Connected to the gas inlet system, through valve 24, is a trace oxygen analyzer 25. This may be, for example, Model No. 303 from Analytic Systems Company, a Division of Research Instruments Corp., Pasadena, California. This is connected to the system between valves 22 and 23 so as to permit analysis of the incoming gas and/or the gaseous environment of the reaction chamber. Also connected to the gas inlet system is an adjustable pressure regulator valve 26, such as Model No. 6A "Cartesian Manostat," Manostat Corporation, and a discharge bubbler 27. A second discharge bubbler 28 is connected by valve 29 to vacuum header 6.

Following evacuation, the chamber was heated to 200°C by moving furnace 5 into heating position around the reaction chamber. At this point $H_2$, which had been purified by passing over hot uranium chips and through a molecular sieve (Linde Division, Union Carbide Corporation), was admitted to the reaction chamber. Regulator valve 26 maintained the $H_2$ pressure at a constant value of approximately one atmosphere. The temperature was maintained at 200°C for approximately 15 minutes at which time the hydriding reaction had ceased. The reaction rate was monitored by observing the rate at which $H_2$ had to be delivered to the system to maintain a pressure of one atmosphere. When the reaction rate was zero, or nearly zero, the temperature was then gradually raised to 45°C at a rate of approximately 10°C per minute to dehydride the newly formed uranium hydride. As soon as this temperature was reached, the temperature was reduced to about 200°C at a rate of about 3½°C per minute by rolling the furnace off of the reaction chamber to hydride a second portion of the uranium metal. A total of six cycles was required to fragment the entire mass into uranium hydride powder.

Following the final hydride cycle, the $H_2$ in the system was flushed out with argon. Nitrogen was then introduced into reaction chamber 1, replacing the argon. Both the nitrogen and argon were purified by passing them over hot chips of Nb-1% Zr and through a molecular sieve. The $N_2$ pressure was maintained at one atmosphere throughout the nitriding process by valve 26. Upon reaching the desired $N_2$ pressure, the temperature was raised to 300°C at a rate of 30°C per minute and held at that temperature for about 10 minutes to decompose a small portion of the hydride to the metal. The temperature was then lowered to about 250°C to bring about controlled nitriding of the small amount of uranium metal. The reaction chamber was then heated at the same rate to about 315°C to decompose another portion of the hydride and thereafter cooled to 250°C to nitride the resulting metal. These cycles were repeated according to FIG. 1 with each dehydriding temperature being about 15°C higher than the previous dehydriding temperature and the nitriding temperature remaining at about 250°C. At the end of 13 cycles the dehydriding temperature of the reaction chamber was 500°C and only traces of $UH_3$ remained. To insure complete conversion to the nitride, the reaction chamber was heated to 500°C after the last nitriding portion of the cycle and evacuated at point E of FIG. 1 to a pressure of approximately $2 \times 10^{-2}$ Torr. This decomposed any last remaining traces of $UH_3$. The reaction chamber was then refilled with nitrogen at point N and cooled to 250°C. All of the uranium hydride had then been converted to uranium nitride.

To adjust the stoichiometry of the product to the desired $UN + UN_{1.5}$ the reaction chamber was heated to 900°C at a rate of approximately 12°C per minute. The reaction chamber was then evacuated to a pressure of $10^{-4}$ Torr, which required about 4 hours. The reaction chamber was then filled with hydrogen and cooled. The hydrogen was used to facilitate cooling and to detect the presence of any free uranium. An uptake of the hydrogen would indicate the presence of uranium metal. The reaction chamber after being cooled to 200°C was heated to 350°C to decompose any $UH_3$ which might have formed. After holding at 350°C for approximately 15 minutes, the chamber was evacuated to $10^{-3}$ Torr to accelerate the decomposition of any $UH_3$. Nitrogen was then reintroduced and the reaction chamber cooled to 200°C to nitride any uranium resulting from the $UH_3$ decomposition. The reaction chamber was then heated to 900°C and evacuated to $10^{-4}$ Torr. After cooling, the product was found to contain 85% UN and 15% $UN_{1.5}$. The entire process required a period of 4 days.

While the foregoing parts of this specification have described the process of this invention as it is applied to the production of uranium nitride, it is readily apparent that the process may be used in the production of many metal nitrides. The essential criterion is that the metal be capable of going through a thermally decomposable hydride intermediate. Nitrides of thorium, plutonium, (uranium, plutonium), americium, and neptunium have been produced by the process of this invention. The process of this invention can be readily automated to achieve a highly efficient and safe process for the production of metallic nitrides.

What is claimed is:

1. A method of producing a metallic nitride selected from the group consisting of uranium nitride, thorium nitride, plutonium nitride, (uranium, plutonium) nitride, americium nitride and neptunium nitride, comprising the steps of heating and cooling a metallic hydride in a nitrogen atmosphere in a cyclic manner with each heating step being to a temperature sufficient to dehydride a portion of the metallic hydride and each cooling step being to a lower temperature than said temperature of heating and sufficient to nitride the dehydrided portion and wherein each successive heating step is to a higher temperature than the previous heating step, and wherein said higher temperature is sufficient to dehydride progressive portions of said metal hydride.

2. A process for producing uranium nitride comprising the steps of providing finely divided uranium hydride powder within a reaction chamber, supplying a nitrogen atmosphere to said reaction chamber, heating said reaction chamber to a first dehydriding temperature sufficient to dehydride a first portion of said powder thus forming uranium metal, cooling said reaction chamber to a nitriding temperature at which said uranium metal will react with said nitrogen atmosphere to form uranium nitride, heating said reaction chamber to a second dehydriding temperature higher than said first dehydriding temperature and sufficient to dehydride a second portion of said powder, cooling said powder to a nitriding temperature at which said second portion will be nitrided, continuing heating and cooling in a cyclic manner with each dehydriding temperature being higher than the previous dehydriding temperature and sufficient to dehydride progressive portions of said powder, and each nitriding temperature being sufficiently below the previous dehydriding temperature that the dehydrided portion is nitrided until substantially all of the uranium hydride is converted to uranium nitride.

3. A method according to claim 2 in which said first dehydriding temperature is approximately 300°C and said nitriding temperature is approximately 250°C.

4. A method according to claim 2 in which each dehydriding temperature is approximately 15°C higher than the previous dehydriding temperature.

5. A method according to claim 2 in which said nitriding temperature is approximately 250°C.

6. A method according to claim 2 wherein the resulting uranium nitride is of non-uniform stoichiometry and comprising the further step of heating said resulting uranium nitride under vacuum to a temperature of approximately 900°C in order to achieve a more uniform stoichiometry.

7. A method according to claim 2 wherein substantially all of said uranium hydride powder is converted to uranium nitride powder when the temperature of said reaction chamber reaches 500°C.

8. A method according to claim 2 wherein each dehydriding temperature is from 5°C to 50°C higher than the previous dehydriding temperature.

9. A method according to claim 2 wherein each nitriding temperature is within the range of 150°C to 275°C.

* * * * *